(12) United States Patent
Gauthier et al.

(10) Patent No.: US 7,195,107 B2
(45) Date of Patent: Mar. 27, 2007

(54) MACHINE HAVING PULLEY COUPLED TO ROTOR AND PARTIALLY OVERLYING STATOR, ELEVATOR SYSTEM INCLUDING MACHINE, AND DRIVE METHOD

(75) Inventors: Pascal Gauthier, Asnieres-sur-Nouere (FR); Christophe Gilles, Angouleme (FR); Pascal Beynaud, Saint-Saturnin (FR)

(73) Assignee: Moteurs Leroy-Somer, Angouleme (FR)

( * ) Notice: Subject to any disclaimer, the term of this patent is extended or adjusted under 35 U.S.C. 154(b) by 273 days.

(21) Appl. No.: 10/687,824

(22) Filed: Oct. 20, 2003

(65) Prior Publication Data

US 2004/0124736 A1    Jul. 1, 2004

(30) Foreign Application Priority Data

Oct. 18, 2002    (FR) ................... 02 12979

(51) Int. Cl.
*B66B 11/00* (2006.01)
(52) U.S. Cl. ..................... 187/259; 187/277
(58) Field of Classification Search ............... 187/254, 187/256, 277, 259, 293–297, 258, 288
See application file for complete search history.

(56) References Cited

U.S. PATENT DOCUMENTS

| | | | | |
|---|---|---|---|---|
| 1,237,321 A * | 8/1917 | Fraser | ......................... | 187/256 |
| 4,355,785 A * | 10/1982 | Tosato et al. | ................ | 254/362 |
| 4,567,419 A * | 1/1986 | Watanabe | ................... | 318/798 |
| 4,771,197 A | 9/1988 | Ivanto et al. | | |
| 4,960,186 A | 10/1990 | Honda | | |
| 5,148,893 A * | 9/1992 | Vertesy et al. | .............. | 254/362 |
| 5,458,216 A * | 10/1995 | Tanaka et al. | .............. | 187/373 |
| 5,469,937 A * | 11/1995 | Hakala et al. | .............. | 187/266 |
| 5,665,944 A * | 9/1997 | Aulanko et al. | ............ | 187/277 |
| 5,669,469 A * | 9/1997 | Ericson et al. | .............. | 188/171 |
| 5,982,060 A * | 11/1999 | Hakala et al. | ............ | 310/67 R |
| 5,996,742 A | 12/1999 | Aulanko et al. | | |
| 6,199,666 B1 | 3/2001 | Aulanko et al. | | |
| 6,234,275 B1 | 5/2001 | Hakala et al. | | |
| 6,328,136 B1 * | 12/2001 | Tauchi et al. | ............... | 187/391 |
| 6,371,248 B1 | 4/2002 | Cholinski | | |
| 6,520,299 B2 | 2/2003 | Rimann et al. | | |
| 6,578,672 B1 * | 6/2003 | Miyoshi | ..................... | 187/254 |
| 6,737,778 B2 | 5/2004 | Daikoku et al. | | |
| 6,830,131 B2 | 12/2004 | Mustalahti et al. | | |
| 6,851,520 B2 * | 2/2005 | Nagata et al. | .............. | 187/286 |
| 2001/0052440 A1 | 12/2001 | Rimann et al. | | |
| 2002/0053838 A1 | 5/2002 | Okuda | | |
| 2003/0155184 A1 | 8/2003 | Cholinski et al. | | |

FOREIGN PATENT DOCUMENTS

| | | |
|---|---|---|
| DE | 42 21 399 A1 | 1/1994 |
| DE | 19634629 A1 | 8/1997 |
| DE | 298 23 327 U1 | 11/1999 |
| DE | 198 46 671 A1 | 4/2000 |
| DE | 199 03 409 C 1 | 7/2000 |

(Continued)

*Primary Examiner*—Jonathan Salata
(74) *Attorney, Agent, or Firm*—Oliff & Berridge, PLC

(57) ABSTRACT

A machine includes a motor that includes a stator carrying a concentrated winding wound on teeth and a rotor rotatable about the stator. The rotor includes a tubular casing and permanent magnets, and a pulley coupled to the rotor.

17 Claims, 2 Drawing Sheets

FOREIGN PATENT DOCUMENTS

| | | |
|---|---|---|
| DE | 199 05 390 C 1 | 10/2000 |
| DE | 100 43 013 C 2 | 4/2002 |
| DE | 100 64 850 A 1 | 7/2002 |
| EP | 0 834 463 A1 | 4/1998 |
| EP | 0 706 968 B1 | 5/2000 |
| EP | 1 028 081 A2 | 8/2000 |
| EP | 1 078 876 A2 | 2/2001 |
| JP | 10-304641 A | 11/1998 |
| JP | 2001-151443 A | 6/2001 |
| WO | WO 98/32685 | 7/1999 |

\* cited by examiner

US 7,195,107 B2

MACHINE HAVING PULLEY COUPLED TO ROTOR AND PARTIALLY OVERLYING STATOR, ELEVATOR SYSTEM INCLUDING MACHINE, AND DRIVE METHOD

FIELD OF THE INVENTION

This invention relates to machines for driving at least one cable. In embodiments, this invention is directed to providing a machine for driving an elevator cable.

BACKGROUND OF THE INVENTION

The axial size of such machines is a determining factor for the cost of installing elevators.

U.S. Pat. No. 4,960,186 discloses a machine in which a pulley is fixed on an end wall of the rotor, thus making it possible to use a pulley of a diameter that is smaller than the diameter of the rotor.

Machines having a disk-shaped rotor and a reduced axial size have been proposed, for example in U.S. Pat. No. 5,996,742.

U.S. Pat. No. 4,771,197 discloses a machine in which the grooves of a pulley are made around the rotor. European Patent EP 0,706,968 and German Patent DE 199 03 409 describe other machines.

SUMMARY OF THE INVENTION

In embodiments, this invention provides a machine which is relatively compact while offering mechanical and electrical performance that make it suitable for driving, for example, an elevator.

In some embodiments, the machine may include a motor including a stator carrying at least one concentrated winding wound on teeth; a rotor around the stator, the rotor including a tubular casing and permanent magnets; and a pulley coupled to the rotor.

The term "stator" designates the assembly of laminations and windings or coils constituting the stationary electrical portion of the machine.

Advantageously, the pulley covers the stator in part, and preferably it covers winding heads of the stator.

The machine maybe made to occupy a small amount of space, particularly in the axial direction.

In embodiments, a tubular casing of the rotor preferably includes a stack of superposed laminations. The stack of laminations may advantageously be maintained in compression by fasteners, such as screws which are engaged in the pulley. This disposition enables the fasteners to provide both for fastening the rotor to the pulley and for maintaining the cohesion of the stack of rotor laminations.

The pulley may have a peripheral portion with grooves formed therein for receiving the cables, and a portion for receiving rotor fasteners, said portion being made integrally with the peripheral portion, e.g. by casting material or by machining. The portion for receiving the rotor fasteners may cover the winding heads of the stator without covering the teeth of the stator. This can make it possible for the pulley to be made out of a solid material that conducts electricity without that leading to major losses by induced current.

The pulley may advantageously have passages to allow air to flow through it, thus making it possible to avoid using a specific fan driven by the shaft of the machine.

The air flow may sweep both the stator and a brake disk.

The machine may include a strip covering an axial free end of the rotor remote from the pulley.

The machine may include at least one parking brake.

The machine preferably is not overhanging by an end part (i.e. fixed in a cantilevered manner). Instead, the machine may be supported by at least one support at each end of the machine.

The machine may include bearings, such as a bearing on each side of both the pulley and the rotor, preferably on each side of both the grooves of the pulley and the magnets of the rotor, supporting the axial ends of a shaft of the rotor. The machine may include only two bearings or may include more than two bearings.

The machine may further include a sensor, for example an optic sensor, of the number of turns of the pulley and/or the rotor around the axis.

The pulley may be connected at an end remote from the stator to a ring for co-operating with jaws of a brake.

In some embodiments, the invention may also provide, independently or in combination with one or more of the above mentioned features, a machine for driving at least one cable, such as an elevator cable, the machine including a pulley and an electric motor; the electric motor including a stator and a rotor coupled to the pulley; the rotor being rotatable about the stator and including permanent magnets present on an inside face of a tubular casing which is directly secured to the pulley via one end.

In some embodiments, the invention may also provide, independently or in combination with one or more of the above mentioned features, a machine for driving at least one cable, such as an elevator cable; the machine including a motor including a stator, and a rotor around the stator; the rotor including a tubular casing and permanent magnets; and a pulley coupled to the rotor and partially covering the stator.

Embodiments of the invention also provide a system and method for driving an elevator, using a motor as described herein for driving a cable of the elevator.

BRIEF DESCRIPTION OF THE DRAWINGS

Embodiments of the invention will be described with reference to the following drawings in which like reference numerals refer to like elements and wherein.

DETAILED DESCRIPTION OF EMBODIMENTS

Figure 1:
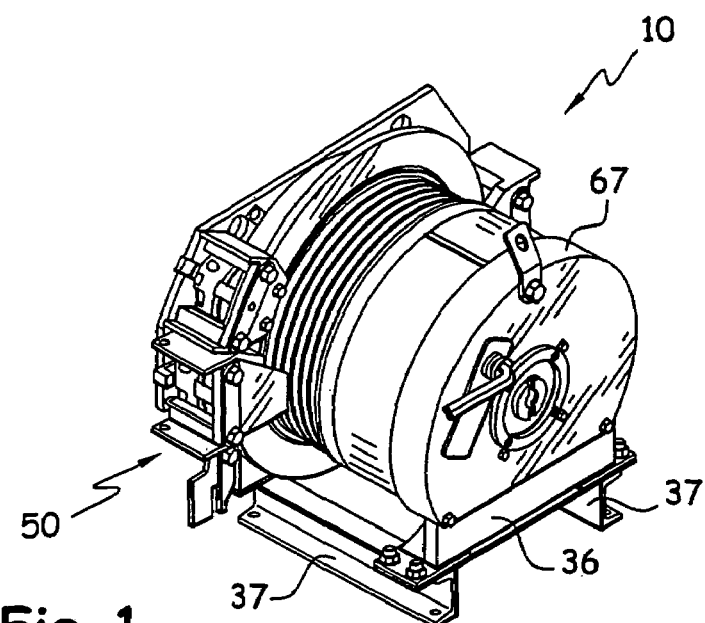
FIG. 1 is a perspective view of one exemplary embodiment of a machine of the invention.

The following detailed description of various exemplary embodiments of this invention may refer to one specific type of machine, a machine including a pulley and an electric motor for driving an elevator cable, for sake of clarity and familiarity. However, it should be appreciated that the principles of this invention, as outlined and/or discussed below, can be equally applied to other known or later developed machines, beyond the machine specifically discussed herein.

FIG. 1 through FIG. 4 show an exemplary embodiment of a machine that incorporates features of the invention. The machine 10 shown in the figures includes a pulley 20 and a motor 30 for driving the pulley 20 in rotation about an axis of rotation X.

The motor 30 includes a stator 31 including a stack of superposed laminations 32, the stack defining teeth 33 on which respective windings 34 are engaged. The laminations 32 are made of magnetic material, and prior to being assembled together, they may be insulated in conventional manner, e.g. with varnish.

The stator 31 is supported by a first end wall 36 which extends perpendicularly to the axis X and which rests on longitudinally-extending rails 37 for securing the machine to its support.

The laminations 32 are engaged on a guide 38 of axis X which is secured at one end to the first wall 36. First wall 36 has the shaft 40 of the machine passing therethrough. The guide 38 serves to transmit the torque that acts on the stator laminations 32 to the first wall 36.

The shaft 40 presents one end which is supported by bearings 41 mounted on the first wall 36.

The other end of the shaft 40 rests on bearings 44 secured to a second end wall 46. Second end wall 46 extends perpendicularly to the axis X and is supported by the rails 37.

The pulley 20 includes a hub 21 which is secured to the shaft 40 and which turns therewith, and a peripheral portion 22 having grooves 23 formed therein, each serving to receive a respective cable C for driving an elevator.

In the embodiment shown in FIG. 1 through FIG. 4, passages 24 are made between the peripheral portion 22 and the hub 21 in order to allow cooling air to flow and in order to lighten the pulley.

The pulley 20 is made to have a ring 25 at one end for co-operating with the jaws of a conventional parking brake 50 supported by the second wall 46. The parking brake 50 supported by second end wall 46 can be seen more particularly in FIG. 3.

At its end opposite from the ring 25, the pulley 20 has an end portion 28 for securing to the rotor 60.

The rotor 60 includes a tubular casing 61 made up of a stack of laminations 62 held in compression by fasteners 63, such as screws, which are engaged at one end 66 in the end portion 28 of the pulley 20 and which bear at the opposite end against the stack of laminations 62.

On its radially inner surface, the rotor 60 also carries a plurality of permanent magnets 64 disposed in such a manner as to interact with the stator 31 so that, when the stator generates a rotating magnetic field, the rotor 60 tends to be entrained to rotate synchronously about the axis X.

The magnets 64 may be bonded to the circularly cylindrical inside surface of the casing 61 by, for example, an adhesive, with the magnets preferably being disposed in rows, each including a plurality of magnets juxtaposed along the direction of the axis X, these rows being spaced apart from one another by gaps 39.

As apparent from the Figures, the rotor 60 may be supported solely by the pulley 20, and may overlie the heads 34a of the windings 34 of the stator without overlying the teeth 33.

Figure 3:
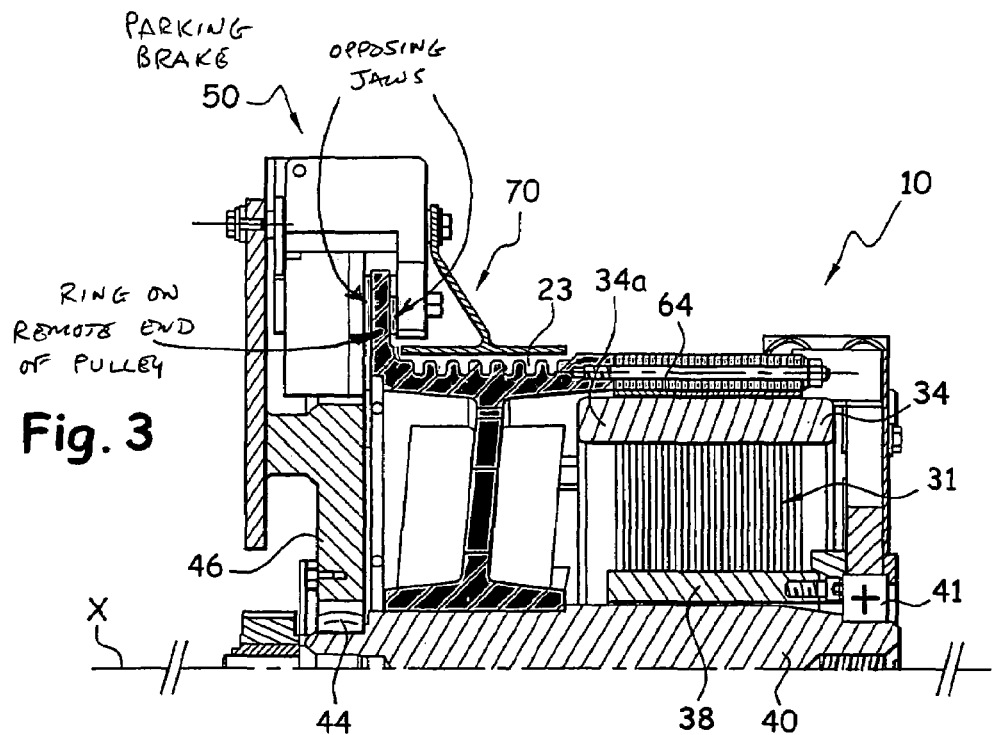
FIG. 3 is an axial half-section view on III—III of FIG. 2.
Figure 4:
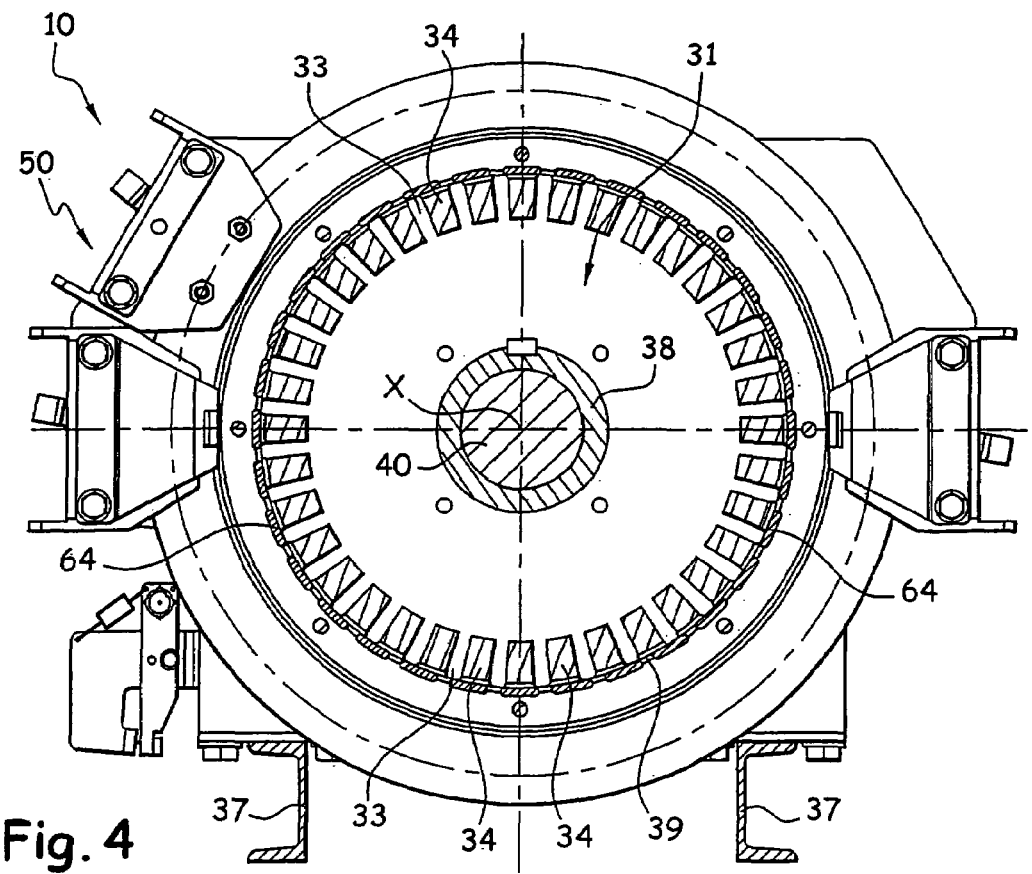
FIG. 4 is a cross-sectional view of a machine of FIG. 1.

The machine 10 may further include a cable protector 70, as shown in FIG. 3.

Figure 2:
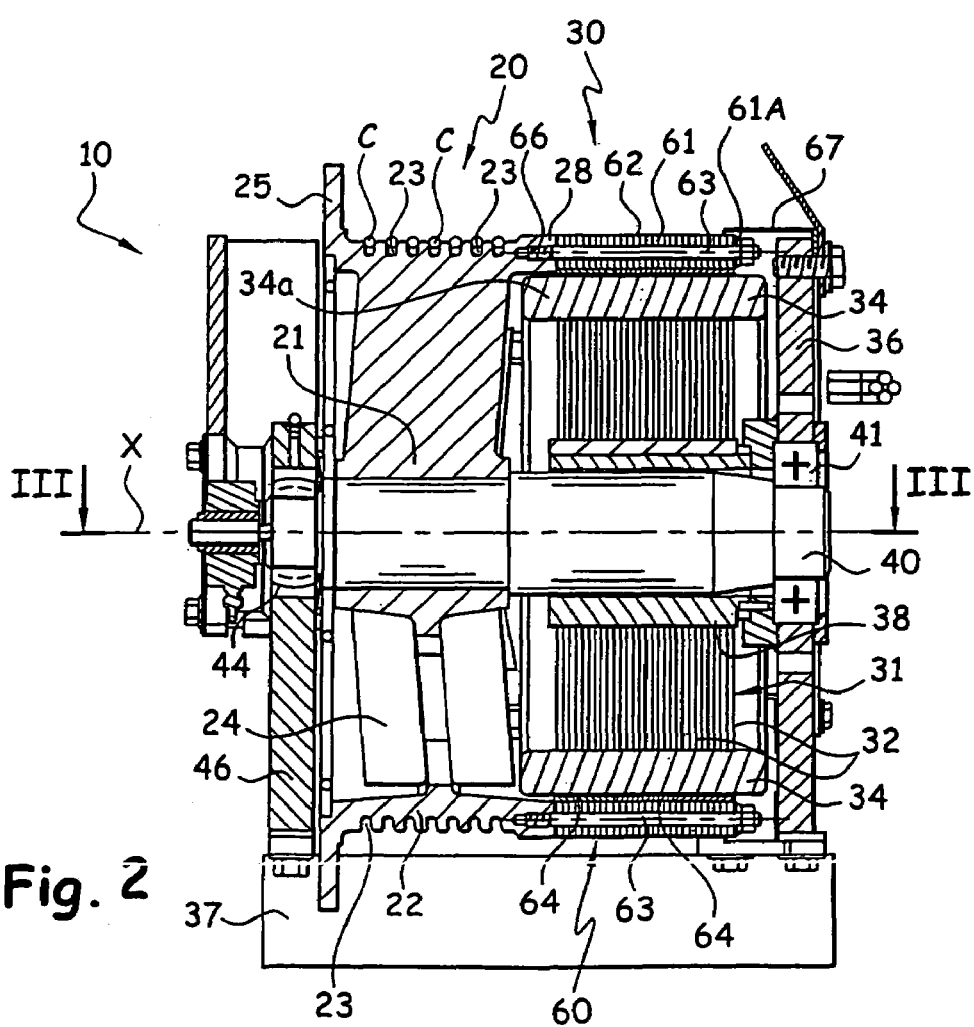
FIG. 2 is a fragmentary axial section view of a machine of FIG. 1.

Advantageously, and as shown in FIG. 1 and FIG. 2, the machine may also include a strip 67 covering the free axial end 61a of the casing 61, this strip 67 being secured to the first wall 36.

Naturally, the invention is not limited to the above description.

For example, the pulley can be made with some other number of grooves, e.g., as a function of the type and characteristics of an elevator or other device to be driven.

As another example, where appropriate, the stack of rotor laminations may be replaced by a solid material, with the tubular casing of the rotor optionally being made integrally with the pulley.

The terms "including a" and "comprising a" appearing herein should be understood as being synonymous with "including at least one" unless specified to the contrary.

While this invention has been described with respect to specific embodiments thereof, it is evident that many alternatives, modifications, and variations will be apparent to those skilled in the art. Accordingly, the embodiments of the invention as set forth herein are intended to be illustrative, not limiting. Various changes may be made without departing from the spirit and scope of the invention.

What is claimed is:

1. A machine, comprising:
   a motor comprising a stator carrying one or more concentrated windings wound on teeth, and a rotor that rotates about the stator, said rotor comprising a tubular casing and permanent magnets; and
   a pulley coupled to the rotor, the pulley comprising a first portion overlying the stator and a second portion not overlying the stator, the second portion of the pulley further comprising grooves formed therein to receive cables, and the first and second portions of the pulley being monolithic.

2. A machine according to claim 1, wherein said one or more concentrated windings have heads, and the first part of the pulley overlies said heads.

3. A machine according to claim 1, wherein the tubular casing comprises a stack of superposed laminations.

4. A machine according to claim 3, wherein the stack of superposed laminations is maintained in compression by fasteners engaged to the pulley.

5. A machine according to claim 4, wherein the second part of the pulley comprises a peripheral portion having the grooves formed therein to receive cables, and the first part of the pulley comprises a portion for receiving the fasteners, the portion for receiving the fasteners being made integrally with the peripheral portion.

6. A machine according to claim 5, wherein said one or more concentrated windings have heads, and wherein the portion for receiving the fasteners covers the heads without covering the teeth of the stator.

7. A machine according to claim 1, wherein the pulley comprises passages enabling air to flow through the pulley.

8. A machine according to claim 1, wherein the rotor has a free axial end remote from the pulley, and comprising a strip covering said free axial end.

9. A machine according to claim 1, wherein the rotor has a shaft, and said machine has only two bearings supporting axial ends of said shaft.

10. A machine according to claim 1, wherein the machine comprises at least one parking brake.

11. A machine according to claim 10, wherein said parking brake comprises jaws.

12. A machine according to claim 11, wherein the pulley comprises an end remote from the stator; wherein said remote end is connected to a ring that co-operates with the jaws of said parking brake.

13. A machine according to claim 1, wherein the machine is supported by at least one support at each end of the machine.

14. An elevator system comprising:
   a machine comprising:
      a motor comprising a stator carrying one or more concentrated windings wound on teeth, and a rotor that rotates about the stator, said rotor comprising a tubular casing and permanent magnets; and a pulley coupled to the rotor, the pulley comprising a first portion overlying the stator and a second portion not overlying the stator, the second portion of the pulley further comprising grooves formed therein to receive cables, and the first and second portions being monolithic:

a cable received by said pulley; and an object supported on the cable.

15. An elevator system according to claim 14, wherein the system further comprises at least one support for said machine at each end of said machine.

16. A method for driving an elevator system, the elevator system including a motor, a pulley, a cable and an object supported on the cable, the motor comprising a stator and a rotor, the stator carrying one or more concentrated windings wound on teeth, and the rotor rotating about the stator, the rotor including a tubular casing and permanent magnets, the pulley being coupled to the rotors, the pulley comprising a first portion overlying the stator and a second portion not overlying the stator, the cable being received by the second portion of the pulley, and the first and second portions of the pulley being monolithic, said method comprising;

driving the cable of the elevator with the machine to elevate the object.

17. A machine according to claim 1, wherein the pulley is secured to a rotating shaft.

\* \* \* \* \*